US009705702B2

(12) United States Patent
Foo et al.

(10) Patent No.: US 9,705,702 B2
(45) Date of Patent: *Jul. 11, 2017

(54) METHOD AND SYSTEM FOR CREATING SOFTWARE DEFINED ORDERED SERVICE PATTERNS IN A COMMUNICATIONS NETWORK

(71) Applicant: Futurewei Technologies, Inc., Plano, TX (US)

(72) Inventors: Ian Foo, Raleigh, NC (US); Shree Murthy, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,888

(22) Filed: Feb. 10, 2015

(65) Prior Publication Data

US 2015/0156035 A1 Jun. 4, 2015

Related U.S. Application Data

(63) Continuation of application No. 13/715,524, filed on Dec. 14, 2012, now Pat. No. 8,989,192.

(Continued)

(51) Int. Cl.
*H04L 12/28* (2006.01)
*H04L 12/46* (2006.01)
(Continued)

(52) U.S. Cl.
CPC ...... *H04L 12/4633* (2013.01); *H04L 12/4645* (2013.01); *H04L 12/5689* (2013.01); *H04L 45/74* (2013.01); *H04L 47/2441* (2013.01)

(58) Field of Classification Search
None
See application file for complete search history.

(56) References Cited

U.S. PATENT DOCUMENTS

| 8,989,192 B2 * | 3/2015 | Foo .................... H04L 47/2441 370/392 |
| 2005/0220022 A1 * | 10/2005 | DelRegno ............... H04L 45/50 370/235 |

(Continued)

OTHER PUBLICATIONS

"IEEE Standard for Local and Metropolitan Area Networks—Media Access Control (MAC) Bridges," IEEE Computer Society, IEEE Std. 802.1D™-2004, Jun. 9, 2004, 260 pages.

(Continued)

*Primary Examiner* — Anh-Vu Ly
(74) *Attorney, Agent, or Firm* — Conley Rose, P.C.

(57) ABSTRACT

A software defined network service (SDNS) node for altering a logical flow of data packets in a network to accommodate predetermined ordered service chains, comprising a receiver configured to receive an encapsulated data packet comprising a tag via a encapsulated tunnel from another SDNS node, wherein the tag identifies an ordered service chain or a next hop in the ordered service chain, a processor coupled to the receiver and configured to decapsulate the encapsulated data packet, and a transmitter coupled to the processor and configured to forward the decapsulated data packet to a service device attached to the SDNS node when the processor determines, based on the tag, that a service on the service device should be applied to the data packet.

18 Claims, 6 Drawing Sheets

Related U.S. Application Data (60) Provisional application No. 61/683,582, filed on Aug. 15, 2012.

(51) Int. Cl.
  H04L 12/851    (2013.01)
  H04L 12/54     (2013.01)
  H04L 12/741    (2013.01)

(56) References Cited

U.S. PATENT DOCUMENTS

| | | | | |
|---|---|---|---|---|
| 2008/0177896 | A1* | 7/2008 | Quinn | G06F 9/5055 709/238 |
| 2009/0037713 | A1* | 2/2009 | Khalid | H04L 12/4633 709/201 |
| 2011/0161521 | A1* | 6/2011 | McDysan | H04L 67/2814 709/246 |
| 2011/0228778 | A1* | 9/2011 | Dyke | H04L 45/66 370/392 |
| 2013/0163594 | A1* | 6/2013 | Sharma | H04L 45/64 370/392 |
| 2014/0010085 | A1* | 1/2014 | Kavunder | H04W 28/08 370/235 |

OTHER PUBLICATIONS

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Section 1," IEEE Computer Society, IEEE Std. 802.3™-2008, Dec. 26, 2008, 671 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Section Two," IEEE Computer Society, IEEE Std. 802.3™-2008, Dec. 26, 2008, 790 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Section Three," IEEE Computer Society, IEEE Std. 802.3198 -2008, Dec. 26, 2008, 315 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Section Four," IEEE Computer Society, IEEE Std. 802.3™-2008, Dec. 26, 2008, 586 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Section Five," IEEE Computer Society, IEEE Std. 802.3™-2008, Dec. 26, 2008, 615 pages.

Cooper, A., et al., "Privacy Considerations for Internet Protocols," draft-lab-privacy considerations-03.txt, Jul. 16, 2012, 36 pages.

Cooper, A., et al., "Privacy Considerations for Internet Protocols," draft-iab-privacy-considerations-04.txt, Oct. 22, 2012, 41 pages.

Farinacci, D., et al., "Locator/ID Separation Protocol (LISP)," draft-ietf-lisp-23, May 4, 2012, 97 pages.

Farinacci, D., et al., "Locator/ID Separation Protocol (LISP)," draft-ietf-lisp-24, Nov. 13, 2012, 97 pages.

"Internet Protocol DARPA Internet Program, Protocol Specification," RFC 791, Sep. 1981, 50 pages.

Bradner, S., et al., "Key words for use in RFCs to Indicate Requirement Levels," RFC 2119, Mar. 1997, 3 pages.

Deering, S., et al., "Internet Protocol, Version 6 (IPv6) Specification," RFC 2460, Dec. 1998, 39 pages.

Srisuresh, P., et al., Traditional IP Network Address Translator (Traditional NAT), RFC 3022, Jan. 2001, 16 pages.

Narten, T., et al., "Guidelines for Writing an IANA Considerations Section in RFCs," RDC 5226, May 2008, 27 pages.

Bagnulo, M., et al., "Stateful NAT64: Network Address and Protocol Translation from IPv6 Clients to IPv4 Servers," RFC 6146, Apr. 2011, 45 pages.

Wasserman, M., et al., "IPv6-to-IPv6 Network Prefix Translation," RFC 6296, Jun. 2011, 32 pages.

Notice of Allowance dated Nov. 10, 2014, 9 pages, U.S. Appl. No. 13/715,524, filed Dec. 14, 2012.

Office Action dated Jul. 22, 2014, 19 pages, U.S. Appl. No. 13/715,524, filed Dec. 14, 2012.

Khasniabish, B., et al., "Requirements for Mobility and Interconnection of Virtual Machine and Virtual Network Elements," draft-khasnabish-vmmi-problems-01.txt, Jun. 29, 2012, 36 pages.

Salvestrini, F., et al., "Change: Enabling Innovation in the Internet Architecture through Flexible Flow-Processing Extensions," D4.2 Inter-platform signalling (revised version), ICT-257422, Specific Targeted Research Project, FP7 ICT Objective 1.1—The Network of the Future, Jan. 30, 2012, 81 pages.

Greenhalgh, A., et al., "Flow Processing and the Rise of Commodity Network Hardware," ACM Sigcomm computer Communication Review, vol. 39, No. 2, Apr. 2009, pp. 19-26.

Nordstrom, E., et al., "Serval: An End-Host Stack for Service-Centric Networking," 9th USENIX Symposium on Networked Systems Design and Implementation, Apr. 25, 2012, 14 pages.

Foreign Communication From A Counterpart Application, PCT Application No. PCT/US2013/054932, Search Report dated Nov. 7, 2013, 4 pages.

Foreign Communication From A Counterpart Application, PCT Application No. PCT/US2013/054932, Written Opinion dated Nov. 7, 2013, 13 pages.

* cited by examiner

METHOD AND SYSTEM FOR CREATING SOFTWARE DEFINED ORDERED SERVICE PATTERNS IN A COMMUNICATIONS NETWORK

CROSS-REFERENCE TO RELATED APPLICATIONS

The present application is a continuation of U.S. patent application Ser. No. 13/715,524 filed Dec. 14, 2012 by Ian Foo, et al., and entitled, "Method and System for Creating Software Defined Ordered Service Patterns in a Communications Network," which claims the benefit of U.S. Provisional Patent Application No. 61/683,582 filed Aug. 15, 2012 by Ian Foo, et al. and entitled "Method and System for Creating Software Defined Ordered Service Patterns in a Communications Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network services are services hosted on a computer network. Network services are usually hosted by servers (or service devices) in the network to provide services or shared resources to client computers. Enterprises may configure network services on a local area network to ensure security, provide e-mail, and provide printing to their employees. Network services may also include a firewall and encryption/decryption services. A specific service may often be assigned or mapped to a specific port number in the network. In some networks, a series of services may need to be provided and the services may need to be provided in a specified order. The services provided and/or the order in which they are provided may change over time. Thus, the network may need to be reconfigured to accommodate the changes.

SUMMARY

In one embodiment, the disclosure includes a software defined network service (SDNS) node for altering a logical flow of data packets in a network to accommodate predetermined ordered service chains, comprising a receiver configured to receive an encapsulated data packet comprising a tag via a encapsulated tunnel from another SDNS node, wherein the tag identifies an ordered service chain or a next hop in the ordered service chain, a processor coupled to the receiver and configured to decapsulate the encapsulated data packet, and a transmitter coupled to the processor and configured to forward the decapsulated data packet to a service device attached to the SDNS node when the processor determines, based on the tag, that a service on the service device should be applied to the data packet.

In another embodiment, the disclosure includes a method in a network node for altering a logical flow of data traffic to accommodate a predetermined ordered service chain, comprising receiving at a receiver an inbound data flow destined for an end point, classifying the inbound data flow with a processor, encapsulating with the processor the inbound data flow, and routing the encapsulated inbound data flow to an encapsulated tunnel based on the classification, wherein the network node routes the inbound data to at least one service in a service device via the encapsulated tunnel, and wherein the network node routes the inbound data transparently to the service device and the end point such that the service device and the end point do not participate in the encapsulation and decapsulation of the inbound data flow.

In another embodiment, the disclosure includes in a software defined network service (SDNS) network node, a computer program product executable by a processor, the computer program product comprising computer executable instructions stored on a non-transitory computer readable medium that when executed by the processor cause the SDNS network node to perform the following: receive an inbound data flow destined for an end point, classify the inbound data flow with a processor, encapsulate the inbound data flow, and route the encapsulated inbound data flow to an encapsulated tunnel based on the classification, wherein the network node routes the inbound data to at least one service in a service device via the encapsulated tunnel, and wherein the network node routes the inbound data transparently to the service device and the end point such that the service device and the end point do not participate in the encapsulation and decapsulation of the inbound data flow.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
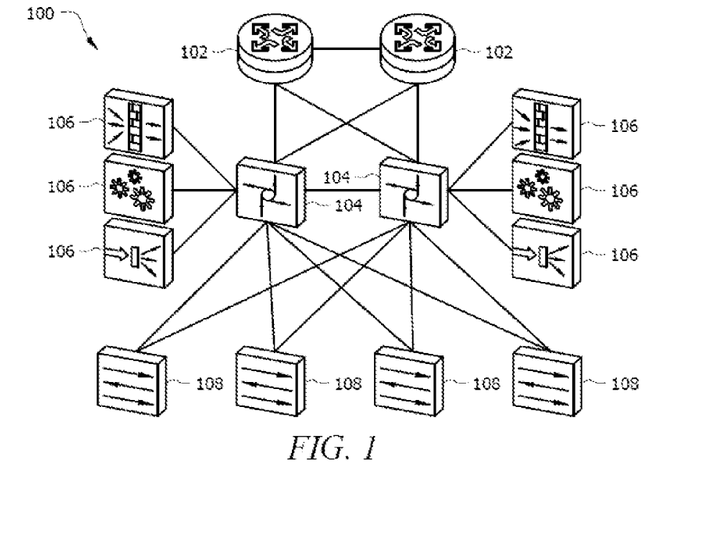
FIG. 1 is a diagram of a network for providing network services to clients.

FIG. 1 is a diagram of a network 100 for providing network services to clients. Network 100 may comprise a plurality of routers 102, a plurality of aggregation points 104, a plurality of service devices 106, and a plurality of switches 108 (e.g., Open Systems Interconnection (OSI) Layer 2 (L2) switches). The routers 102 may couple the network 100 to other networks or other devices or clients (not shown) in the network 100. The aggregation points 104 may be coupled to the routers 102 and configured to enforce service chains (e.g., two or more services that may need to be executed in a specified order) that may be provided to clients coupled to the routers 102. The switches 108 may be coupled to the aggregation points 104 as shown and may connect the network 100 to other devices (not shown). The service devices 106 may provide various services, such as a firewall, encryption/decryption, wide area network (WAN) optimization, server load balancing (SLB), and monitoring services. The services provided by the service devices 106 may enforce various security policies for an enterprise to ensure, for example, that files are not accessed without authorization and to ensure the integrity of the files. The services and order of services in a service chain may change with time. For example, the services provided by the service devices 106 used by an enterprise to ensure security may change over time to address new threats that may appear. Furthermore, the enterprise may have multiple service chains that are implemented in different situations.

The network 100 may use a spanning tree protocol (STP) (as defined in Institute of Electrical and Electronics Engineers (IEEE) 802.1D) based L2 forwarding path for service path determination. IEEE 802.1D is incorporated herein by reference as if reproduced in its entirety. Each chain link (link between services) may require a unique virtual local area network (VLAN), and the VLANs may span the network topology. Each permutation of service chains may require a new L2/STP path and additional VLANs. Changing the service chains in network 100 may require a complex reconfiguration of the L2 path and the service devices. The network 100 may be inflexible in terms of service placement and the scalability may be limited to port density of the aggregation devices 104. Additionally, complexity in deployment and changes is very high, which may increase the probability of an error or an outage. Changes affect the aggregation points 104 which magnify the potential impact of any errors introduced by the changes. Furthermore, the service devices must be made aware of changes to the service chains.

Figure 2:
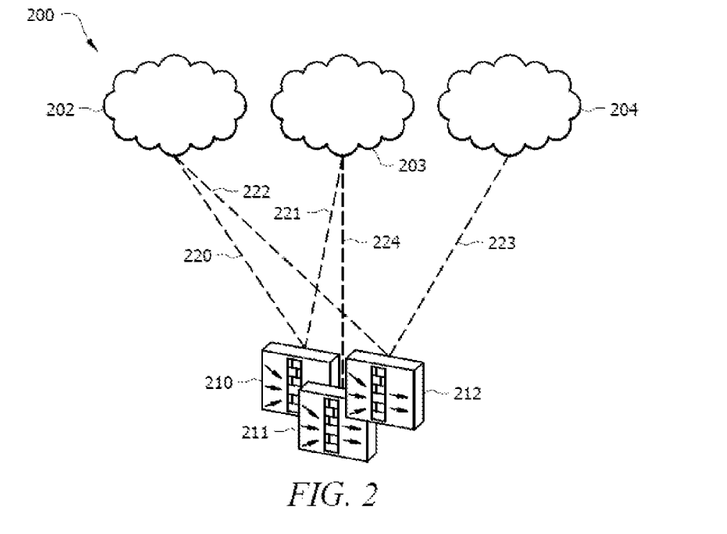
FIG. 2 is another example of a network for providing network services to clients.

FIG. 2 is another example of a network 200 for providing network services to clients. The network 200 may comprise a plurality of domains 202, 203, 204 and a plurality of service devices 210, 211, 212. The security requirements for network 200 may require that communication between clients in domain 202, and clients in domain 203 be required to pass through a firewall in service device 210. Similarly, the security requirements for the network 200 may require that communication between clients in domain 202 and clients in domain 204 pass through a firewall in service device 212. The security requirements for the network 200 may require that all communications to or from client in domain 203 pass through a firewall in service device 211. To accomplish these security requirements, L2/STP VLANs 220, 221, 222, 223, 224 must be configured between the domains 202, 203, 204 and the service devices 210, 211, 212 as shown. Any changes to the security policy requiring the addition, removal, or changes in the services may require that new L2/STP VLANs be established and configured. Thus, as with network 100, changes to network 200 may require a complex reconfiguration of the L2 path and the service devices. Furthermore, network 200 may suffer from many or all of the problems associated with network 100.

Disclosed herein are systems, methods, and apparatuses for software defined service chains. This disclosure outlines a method to employ a software defined overlay network that provides logical path forwarding alteration, via classification, tagging, and encapsulation to enable the direction of traffic through one (or more) network services or service platforms. The disclosed system may combine software defined classification, forwarding, encapsulation rules, and an overlay encapsulation that provides the ability to allow for the creation of a logical sub-network that can be modified arbitrarily with little overall impact to the network or existing data flows. This may effectively create a logical "service chain" where each link in the chain is a service stop allowing the application of one or more network services. In an embodiment, a software defined network service (SDNS) node closest to the source of a data packet may classify the data packet, map the classification to a tag representing that class, type, or group of data, and route the data packet to a specific encapsulation tunnel based on the classification. Intermediate SDNS nodes may decapsulate the data packet and forward the decapsulated data packet to a service device for processing and then receive the processed data packet back from the service device. The intermediate SDNS node may re-encapsulate the processed data packet based on the tag or classification and forward the encapsulated data packet to the next hop in the service chain until all services have been applied to the data packet in the specified order. The data packet may be decapsulated by a last SDNS node in the service chain and forwarded to the end point or client. The service devices and end points need not be aware of the encapsulation mechanism and need not be modified. Other nodes (e.g., switches, routers, etc.) in the network may forward the encapsulated packets without being aware of the encapsulation.

The combination of software defined classification, forwarding, encapsulation rules and the overlay encapsulation ability may allow for the creation of a logical sub-network that can be modified arbitrarily with little overall impact to the network or existing data flows. This effectively creates logical "service chains" where each link in the chain is a service stop allowing the application of one or more network services.

The disclosed software programmed classification, forwarding, and encapsulation to create network service based traffic engineering may provide the ability to create arbitrary (e.g. defined by an administrator without creating new VLANs or other tunnels) logical traffic paths to apply arbitrary data path services in a specific order. This in turn may introduce novel methods of load balancing and scaling the services, which is not possible using current or traditional methods of implementation or deployment without creating and configuring additional tunnels, which may be quite complicated and expensive. In some embodiments, the disclosed system provides a mechanism to use the unique identifiers present in the encapsulation mechanism such as Virtual eXtensible Local Area Network (VXLAN), Network Virtualization using Generic Routing Encapsulation (NVGRE), etc. to uniquely identify/encode a service sequence to which the traffic should be redirected based on the classification. The unique identifiers may be certain fields present in various encapsulation mechanisms. For example, the unique identifier may include the VNI in the VXLAN encapsulation mechanism and may include the tenant ID in the NVGRE encapsulation mechanism. The unique identifiers (or tags) may be used to encode the service sequence, class, type, etc. This may not require any new information in the encapsulation headers. Instead, the encapsulation mechanism may reuse existing headers in a unique way to define a service sequence which is understood and interpreted only by certain network elements (e.g., SDNS nodes). The rest of the network may be transparent to the disclosed mechanism since the SDNS nodes may encapsulate the data packets during transport to other SDNS nodes and decapsulate the data packets for transmission to the services and/or destinations. In an embodiment, the disclosed mechanisms and methods may use existing hardware that already supports encapsulation mechanisms.

The disclosed system and methods provide a mechanism for mapping the uniquely encoded encapsulation header identities (i.e., tags) to the entities that the existing services (e.g., VLANs) can understand and vice versa to maintain the transparency of services to the service sequencing mechanisms. The disclosed systems and methods may ensure that there is no change required in the services and may enable easy plug and play for third party services. The disclosed methods may maintain the mapping in network elements while the services remain transparent to the service sequencing, thereby enabling easier, faster, and transparent deployment. For example, the tag may be a virtual network interface (VNI) when the tunnel encapsulation is a VXLAN. The tag may be a tenant identifier (ID) when the encapsulation mechanism is NVGRE. VNI is part of the VXLAN header and tenant ID is part of the NVGRE header. Other tags may be used for different encapsulation mechanisms. Thus, the mapping maintained in the network elements may be, for example, a VNI to VLAN mapping or a tenant identifier to VLAN mapping. The network elements may maintain a mapping between the identifier present in the network (e.g., a VLAN identifier) to the identifier that the service devices may understand. The mapping may be localized to the device to which the service is attached. The disclosed systems and methods may decouple services from the physical topology. The disclosed systems and methods may reduce operation expenses as compared with current or traditional methods of implementation or deployment of network services. Additionally, the disclosed systems and methods may provide a more flexible use of existing resources and improve the long-term data center lifecycle. The disclosed systems and methods may also enable services virtualization.

Figure 3:
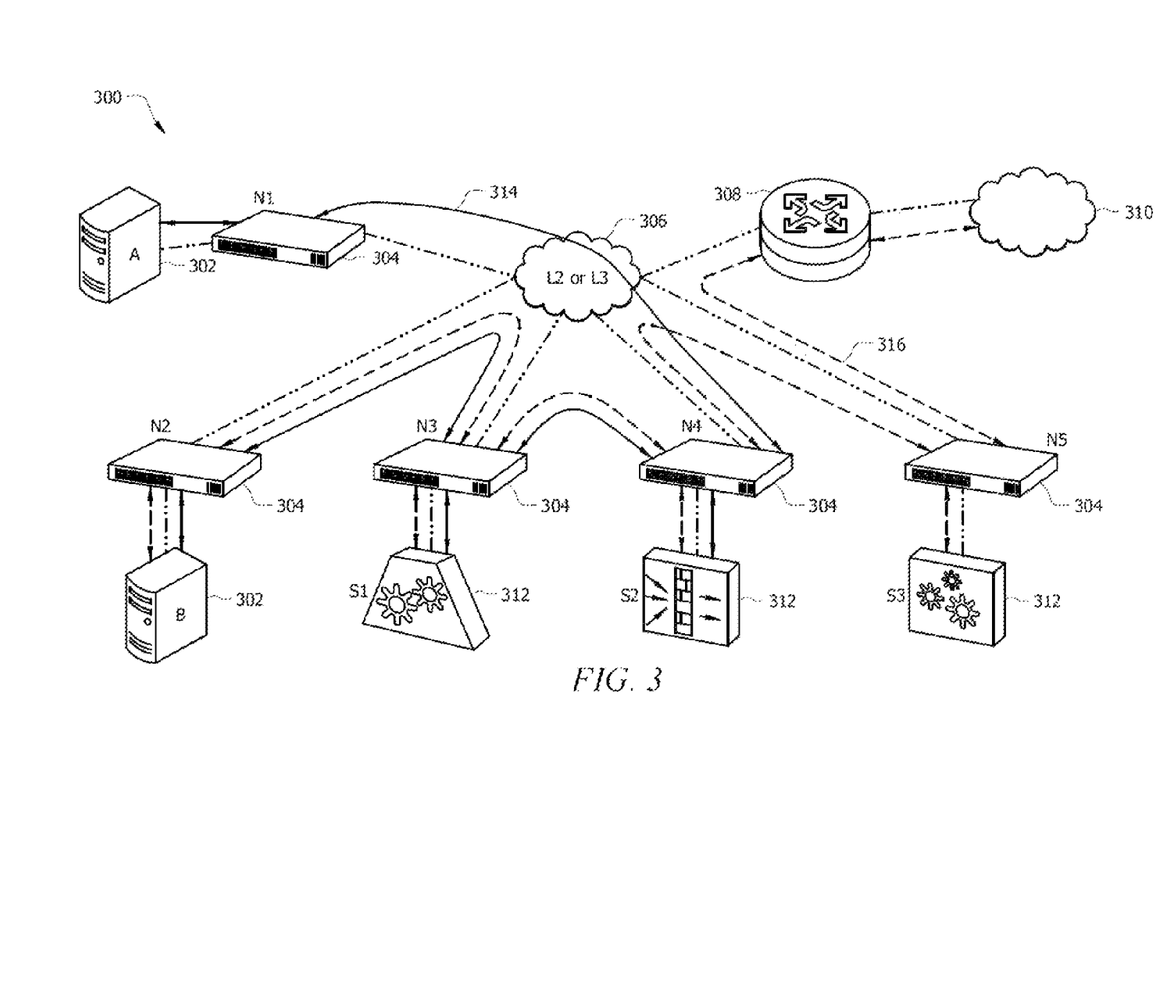
FIG. 3 is a schematic diagram of a network implementing a software defined overlay network for creating and enforcing ordered service chains according to a disclosed embodiment.

FIG. 3 is a schematic diagram of a network 300 for implementing a software defined overlay network for creating and enforcing ordered service chains according to a disclosed embodiment. The network 300 may be an Ethernet network, an Internet Protocol (IP) network, Multi-Protocol Label Switching (MPLS) network, or any other packet switched network (PSN). The network 300 may comprise a combination of different types of PSNs. The network 300 may comprise end points 302, SDNS nodes 304, a network domain 306, an edge node 308, an external domain 310, and service devices 312. The end points 302 may be file servers or other devices that provide files or data to clients. The SDNS nodes 304 and similarly the edge node 308 may be any nodes, devices, or components configured to receive, transmit, and/or forward packets in the network 300. The network domain 306 may comprise an OSI L2 or an OSI layer 3 (L3) for transferring data. The network domain 306 may comprise a plurality of nodes, switches, routers, or other devices configured to receive, transmit and/or forward packets. The edge node 308 may facilitate communication between the components 302, 304, 306, and 312 and devices (e.g., clients) located in an external domain 310. The service devices 312 (which may also be referred to as service platforms) may process the data packets flowing through the network 300 and apply various services. Examples of services that may be provided by service devices 312 include a firewall, server load balancing, encryption/decryption, WAN optimization, and a monitoring service. The transport mechanism between the components of network 300 may be any transport system capable of transporting data packets between components. The transport mechanism may be an L2 network, an L3 network, an Ethernet as defined by IEEE 802.3 which is incorporated herein by reference as if reproduced in its entirety, and/or a Transmission Control Protocol/Internet Protocol (TCP/IP) based network. The components of network 300 may be arranged as shown in FIG. 3.

The SDNS nodes 304 may be configured to implement software defined service chains. The SDNS nodes 304 may maintain encapsulation tunnels or mechanisms (e.g., VLANs, VXLANs) between each other and may use the encapsulation tunnels to forward encapsulated data packets. The SDNS nodes 304 may be configured to form a logical service chain sequence through which network traffic (e.g., data packets) may be forced in order to apply specific network born services in a specific order. The SDNS nodes 304 may provide for flexible logical service chains and data paths that allow a simple insertion, removal, or modification of service elements in the logical chain. The SDNS nodes 304 may be configured to classify inbound data packet based on the type of data packet, the source, the destination, the ingress point, and/or some other classification system. The classification or the tag may correspond to an administrative set of rules for applying an ordered chain of services. Thus, the classification system may indicate a service chain order for applying services to the data packet. In an embodiment, the SDNS node 304 closest to the data flow source may classify the inbound data packet. The SDNS node 304 may map the classification to a tag that represents that class, type, or group of data packets. The tag may provide an SDNS node 304 with an identification of the specific ordered service chain to apply to the data packet, a next hop in the chain of the ordered service chain, and/or identify the rules for forwarding the data packet. The SDNS node 304 may encapsulate the data packet (including the tag or other identifier) and route the encapsulated data packet to a specific encapsulation tunnel or mechanism (e.g., an existing VLAN) based on the classification and/or tag. The encapsulated data packet may comprise the tag or classifier. The classification and/or tag may be associated with a specified ordered service chain. The specified ordered service chain may change over time and may be changed by an administrator. The rules to determine an ordered service chain for a data packet based on the classification or tag associated with the data packet may be pushed or transmitted to all the SDNS nodes 304 by an administrator. After encapsulation, the encapsulated inbound data packet may be transported across the network 300 via the encapsulated tunnel.

A SDNS node 304 (e.g., an intermediate node) nearest or connected to a specified next service device 312 may receive and decapsulate the data packet. Based on the tag or other information in the payload of the data packet, the intermediate SDNS node 304 may determine that the data packet should be forwarded to the attached service device 312 for processing. Based on this determination, the intermediate SDNS node 304 may forward the decapsulated native data packet to a service device 312 connected to the SDNS node 304 for processing by the service device 312. The service device 312 may return the processed data packet back to the SDNS node 304 from which the service device 312 received the data packet. The SDNS node 304 nearest the service device 312 may receive the data packet, reclassify and remap the data packet, tag the data packet, encapsulate the data packet and router the encapsulated data packet to a specific encapsulation tunnel or mechanism based on the classification and/or tag. The re-classification and re-tagging may result in the same or different classification or tag as that done by the first SDNS node 304. The encapsulated data packet may be routed to the next SDNS node 304 specified by the service chain order that may be identified by the classification and/or tag.

The next SDNS node 304 may perform steps similar to the previous SDNS node 304 if another service is to be applied to the data packet. When all the services have been applied as specified by an administrative set of rules governing ordered service chains, the data packet may be received by a SDNS node 304 (e.g., egress node) closest to the destination of the data packet. The egress SDNS node 304 may decapsulate the data packet and forward the data packet to the destination (e.g., end point 302 or a client coupled to external domain 310).

The data packet may be forwarded across the network domain 306 by nodes (e.g., switches, routers, etc.) not participating in the encapsulation/decapsulation mechanism and which may not be aware of the underlying nature of the encapsulated data packet. The solid arrows 314 and the dashed arrows 316 indicate examples of data flows through the network 300. For example, arrow 314 shows the data path for a first data flow. The data flow may originate in end point 302 (labeled A) and be transmitted to SDNS node 304 (labeled N1). Node N1 may classify and/or tag the data flow, encapsulate the data flow and transmit the encapsulated data flow to node N4 via the network domain 306. The nodes, switches, routers, and devices of network domain 306 may forward the encapsulated packet without being aware of the underlying content and without decapsulating and inspecting the payload. Node N4 may decapsulate the data flow and forward the decapsulated data flow to service device S2 for processing. The service device S2 may forward the processed data flow back to node N4 which may reclassify, re-tag, and re-encapsulate the data flow and then forward the re-encapsulated data flow through an existing encapsulation tunnel (e.g., a VLAN, a VXLAN) to node N3 through network domain 306. Similarly, node N3 may decapsulate the data flow, forward the decapsulated data flow to service device S1 for processing, receive the processed data flow from service device 312, reclassify, re-tag, and re-encapsulate the data flow, and forward the encapsulated data flow through an existing encapsulation tunnel to node N2 via network domain 306. Node N2 may receive the encapsulated data flow, decapsulate the data flow and forward the decapsulated data flow to the end point B. End point B may return a data flow back to end point A, which may follow the same course in reverse order back to end point A and processed in a similar manner on the return path.

Arrow 316 may represent the path of another data flow entering the network 300 from external domain 310 at router 308. The data flow represented by arrow 316 may follow a path as shown in FIG. 3 and may be handled in a similar manner to that of the data flow associated with arrow 314.

Figure 4:
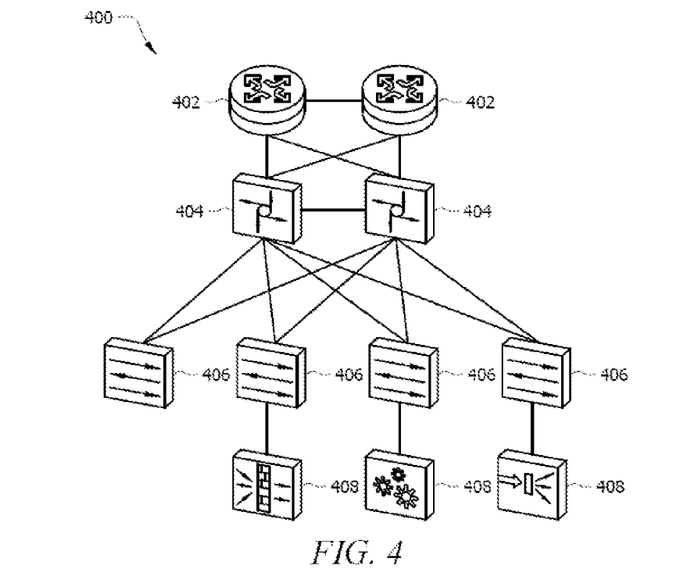
FIG. 4 is a schematic diagram of a network implementing a software defined overlay network for creating and enforcing ordered service chains according to a disclosed embodiment.

FIG. 4 is a schematic diagram of a network 400 implementing a software defined overlay network for creating and enforcing ordered service chains according to a disclosed embodiment. Network 400 may comprise routers 402, aggregation points 404, L2 switches 406, and service devices 408. Routers 404 may connect network 400 with other clients, servers, nodes, devices, networks, and/or domains. The routers 402 may be connected to the aggregation points 404. The aggregation points 404 may be connected to the L2 switches 406 that may provide a connection to the service devices 408. The L2 switches may be similar to SDNS nodes 304 in FIG. 3. The L2 switches 406 may have encapsulated tunnels configured to connect to each other through aggregation points 404. The service devices 408 may be similar to service devices 312 in FIG. 3. In contrast to network 100 in FIG. 1, the service devices do not need to have VLANs configured to couple to the aggregation points for each service chain path. Rather, the service devices are directly connected to the L2 switches 406, and the service order chaining mechanism implemented by the L2 switches is transparent to the service devices 408, the routers 402, and the aggregation points 404. The service order chaining mechanism may be transparent to the service devices 408, the routers 402, and the aggregation points 404 since the ordering may be performed by the L2 switches 406 that encapsulate and decapsulate the data packets. The ordering may be encoded in the encapsulated data packets. The service devices 408, the routers 402, and the aggregation points 404 may not participate in the encapsulation/decapsulation processes.

Figure 5:
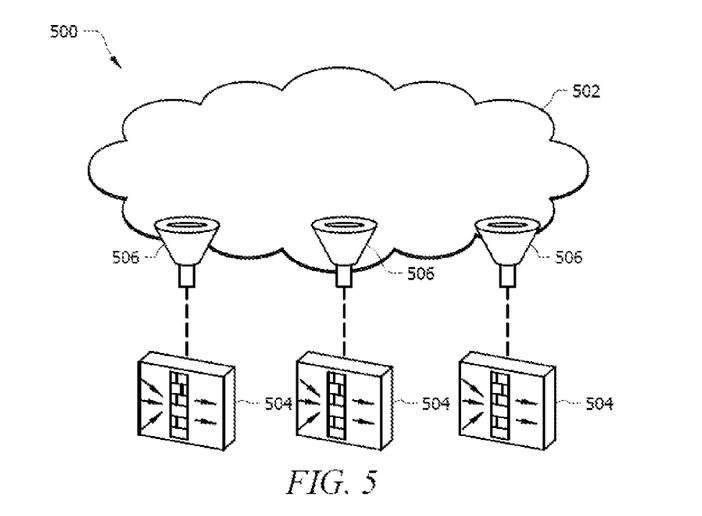
FIG. 5 is a schematic diagram of a network for implementing a software defined overlay network for creating and enforcing ordered service chains according to a disclosed embodiment.

FIG. 5 is a schematic diagram of a network 500 for implementing a software defined overlay network for creating and enforcing ordered service chains according to a disclosed embodiment. Network 500 may comprise a domain 502 and a plurality of service devices 504. The service devices 504 may be connected directly to edge devices 506 in the domain 502. The edge devices 506 may be similar to SDNS nodes 304 in FIG. 3. FIG. 5 shows that, in contrast to network 200 in FIG. 2, the service devices 504 do not need to be connected to the rest of the network 500 via VLANs or other encapsulated tunnels.

Figure 6:
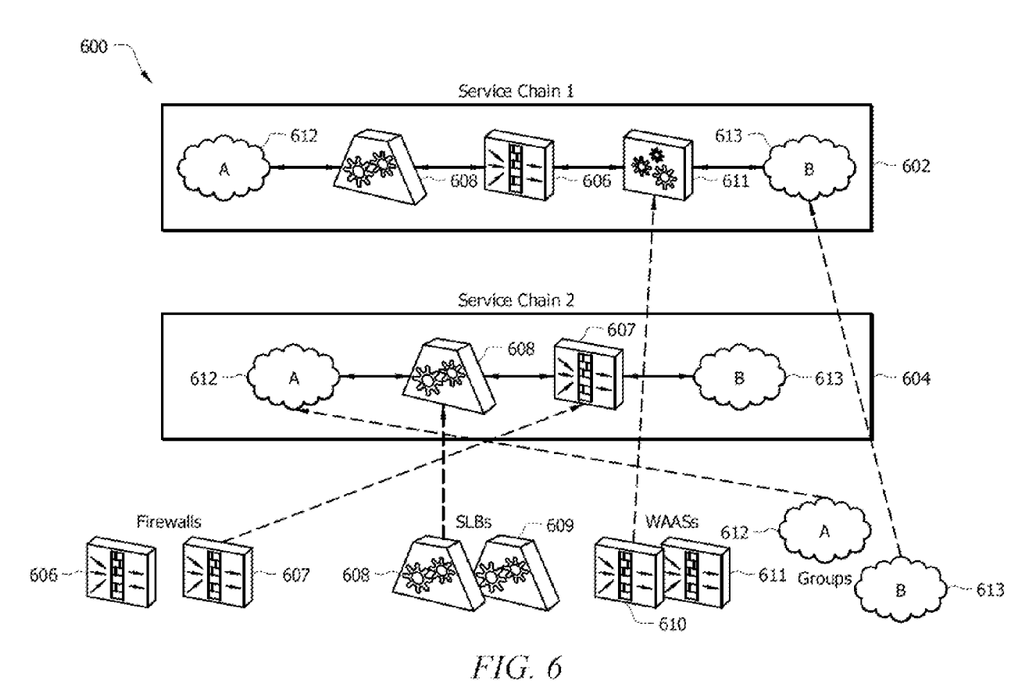
FIG. 6 is a diagram of a user interface for creating ordered service chains according to a disclosed embodiment.

FIG. 6 is a diagram of a user interface 600 for creating ordered service chains according to a disclosed embodiment. The user interface 600 may comprise a plurality of icons representing different services and groups within a network, such as network 300. The service icons may include firewall icons 606, 607, SLB icons 608, 609, Wide Area Application Services (WAAS) icons 610, 611, and group A icon 612 and group B icon 613. An administrator may select various icons and move a copy of the icon into a service chain area 602, 604. The administrator may order the icons 606-613 in the service chain areas 602, 604 to create a rule for an ordered service chain that may be promulgated to SDNS nodes 304 for implementation. The user interface 600 shows two service chains. Service chain 1 in service chain area 602 shows an ordered service chain comprising group A 612, SLB 608, firewall 606, WAcc 611, and group B 613. Service chain 2 in service chain area 604 shows an ordered service chain comprising group A 612, SLB 608, firewall 607, and group B.

Figure 7A:
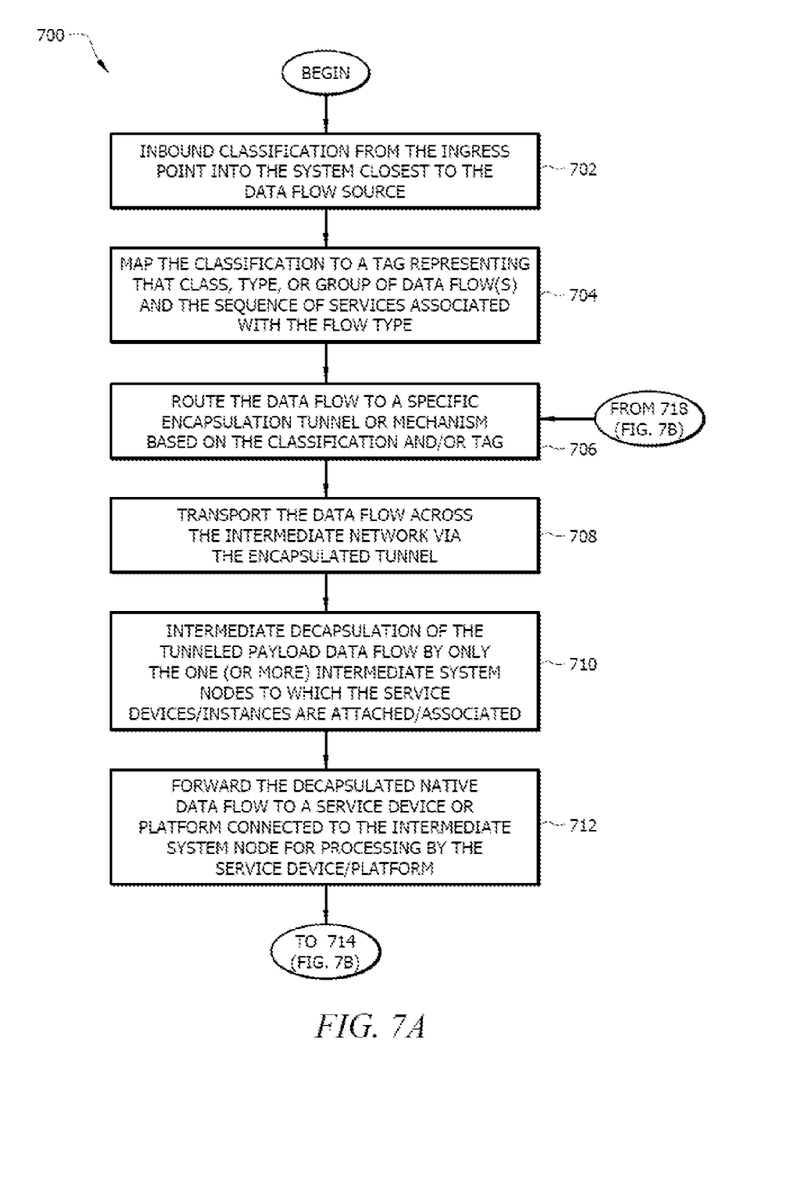
FIGS. 7A and 7B show a flowchart of a method for implementing a software defined service chain according to a disclosed embodiment.
Figure 7B:
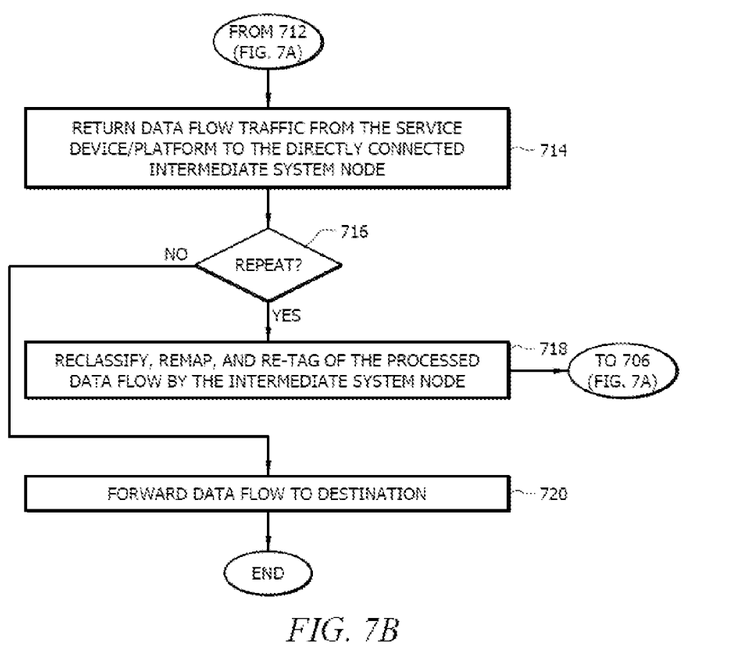

FIGS. 7A and 7B show a flowchart of a method 700 for implementing a software defined service chain according to a disclosed embodiment. The method 700 may begin at block 702 where a SDNS node 304 at an ingress point in the network 300 closest to an inbound data flow so may classify the inbound data flow. At block 704, the SDNS node 304 may map the classification to a tag representing the class, type, or group of the data flow and that representing the sequence of services associated with the flow type. At step 706, the SDNS node 304 may encapsulate the data flow and route the data flow to a specific encapsulation tunnel or mechanism based on the classification and/or tag. At block 708, the encapsulated data flow may be transported across the intermediate network via the encapsulated tunnel.

At block 710, an intermediate SDNS node 304 to which the service devices/instances 312 are attached may decapsulate the tunneled payload data flow. (The intermediate SDNS nodes 304 to which a service device/instance 312 is not attached or that the service for the service device/instance 312 is not used for the particular data flow may refrain from decapsulating the tunneled payload data flow.) At block 712, the intermediate SDNS node 304 may forward the decapsulated native data flow to a service device or platform 312, service device 408, service device 504, or one of service devices 606-611 connected to the intermediate SDNS node 304 or L2 switch 406 for processing by the service device/platform 312, service device 408, service device 504, or one of service devices 606-611. At block 714, the service device/platform 312, service device 408, service device 504, or one of service devices 606-611 may return the data flow traffic to the directly connected intermediate SDNS node 304 or L2 switch 406. At block 716, if there are additional services to be performed on the data flow, the method 700 may proceed to block 718 where the intermediate SDNS node 304 or L2 switch 406 may reclassify, remap, and re-tag the processed data flow from the service device/platform 312, service device 408, service device 504, or one of service devices 606-611, after which the method 700 may proceed to block 706. At block 716, if there are no additional services to be performed, the method 700 may proceed to block 720 the data flow may be forwarded to the destination (e.g., endpoint 302, domain 310, or one of domains 612, 613), after which, the method 700 may end.

The disclosed methods, systems, and apparatuses include software defined forwarding tables to allow Top of Rack (ToR) to classify traffic and to define next hop based on classification. The disclosed methods, systems, and apparatuses provide flexible service placement: any service can be on any ToR. Additionally, the disclosed methods, systems, and apparatuses scales with number of ToRs (horizontal scaling), uses Software Defined Networking (SDN) defined paths for service chains, and VLANs remain localized. Furthermore, changes do not require reconfiguration of service devices, thus resulting in a more dynamic network. The disclosed methods, systems, and apparatuses may lower configuration complexity, which may lower the probability of error/outage. The disclosed methods, systems, and methods also provide that the changes are implemented on ToR reducing the scope of potential impact.

Figure 8:
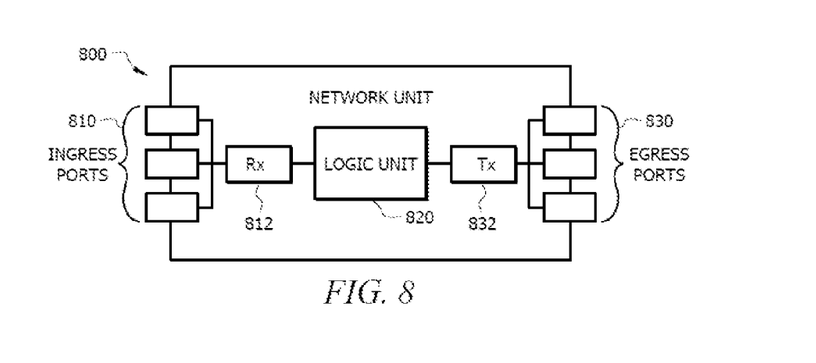
FIG. 8 is a schematic diagram illustrating an embodiment of a network unit, which may be any device that transports and processes data through the network.

FIG. 8 illustrates an embodiment of a network unit 800, which may be any device that transports and processes data through the network. For instance, the network unit 800 may correspond to SDNS nodes 304 described above. The network unit 800 may comprise one or more ingress ports or units 810 coupled to a receiver (Rx) 812 for receiving signals and frames/data from other network components. The network unit 800 may comprise a logic unit 820 to determine which network components to send data to. The logic unit 820 may be implemented using hardware, software, or both. The logic unit 820 may be implemented as one or more central processing unit (CPU) chips, or may be part of one or more application specific integrated circuits (ASICs). The network unit 800 may also comprise one or more egress ports or units 830 coupled to a transmitter (Tx) 832 for transmitting signals and frames/data to the other network components. The logic unit 820 may also implement or support the software defined networking ordered service chain procedures described above. The components of the network unit 800 may be arranged as shown in FIG. 8.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
receiving, by a service chain node, an encapsulated service chain packet from a classifying node along a service chain path;
removing a service chain encapsulation containing the service chain path from the encapsulated service chain packet to generate a service chain packet without the service chain path;
delivering the service chain packet to a service device that is not aware of any part of the service chain path due to removal of the service chain encapsulation;
receiving the service chain packet back from the service device as an updated packet;
re-applying the service chain encapsulation to the updated packet; and
forwarding the updated packet along the service chain path,
wherein the service chain path defines a sequence of services to be performed.

2. The method of claim 1, wherein the service chain encapsulation comprises information identifying the service chain path.

3. The method of claim 1, further comprising identifying the service device based on information in the service chain encapsulation.

4. The method of claim 1, wherein the classifying node is positioned as an ingress node to a network domain for service chaining.

5. The method of claim 1, wherein forwarding e updated packet along the service chain path comprises forwarding the updated packet to a second service chain node for application of a second service along the service chain path.

6. The method of claim 1, wherein the service chain packet is delivered to the service device via a virtual local area network (VLAN), a Virtual eXtensible Local Area Network (VXLAN), or a native Ethernet packet.

7. The method of claim 1, wherein the service chain packet is delivered to the service device via generic routing encapsulation.

8. The method of claim 1, wherein re-applying the service chain encapsulation to the updated packet comprises classifying the updated packet.

9. A method comprising:
receiving, by a service chain node, an encapsulated service chain packet from a classifying node along a service chain path;
removing a service chain encapsulation from the encapsulated service chain packet to generate a service chain packet without the service chain path;
delivering the service chain packet to a service device that is not aware of any part of the service chain path due to removal of the service chain encapsulation;
receiving the service chain packet back from the service device as an updated packet;
re-applying the service chain encapsulation to the updated packet; and
forwarding the updated packet along the service chain path,
wherein the service chain encapsulation comprises information identifying the service chain path, and
wherein the service chain encapsulation further comprises information indicating an order of services for application to a flow traversing the service chain path.

10. An apparatus comprising:
a receiver configured to receive an encapsulated service chain packet from a classifying node along a service chain path;
a processor coupled to the receiver and configured to remove a service chain encapsulation containing the service chain path from the encapsulated service chain packet to generate a service chain packet without the service chain path; and
a transmitter coupled to the processor and configured to transmit the service chain packet to a service device that is not aware of any part of the service chain path due to removal of the service chain encapsulation by the processor,
wherein the receiver is further configured to receive the service chain packet ack from the service device as an updated packet,
wherein the processor is further configured to re-apply the service chain encapsulation to the updated packet,
wherein the transmitter is further configured to forward the updated packet along the service chain path,
wherein the service chain path defines a sequence of services to be performed.

11. The apparatus of claim 10, wherein the service chain encapsulation comprises information identifying the service chain path.

12. The apparatus of claim 10, wherein the processor is further configured to identify the service device based on information in the service chain encapsulation.

13. The apparatus of claim 10, wherein the classifying node is positioned as an ingress node to a network domain for service chaining.

14. The apparatus of claim 10, wherein forwarding the updated packet along the service chain path comprises forwarding the updated packet to a service chain node for application of a second service along the service chain path.

15. The apparatus of claim 10, wherein the service chain packet is delivered to the service device via a virtual local area network (VLAN) or a Virtual eXtensible Local Area Network (VXLAN).

16. The apparatus of claim 10, wherein the service chain packet is delivered to the service device via generic routing encapsulation.

17. The apparatus of claim 10, wherein re-applying the service chain encapsulation to the updated packet comprises classifying the updated packet.

18. An apparatus comprising:
a receiver configured to receive an encapsulated service chain packet from a classifying node along a service chain path;
a processor coupled to the receiver and configured to remove a service chain encapsulation from the encapsulated service chain packet to generate a service chain packet without the service chain path; and
a transmitter coupled to the processor and configured to transmit the service chain packet to a service device that is not aware of any part of the service chain path due to removal of the service chain encapsulation by the processor, wherein the receiver is further configured to receive the service chain packet back from the service device as an updated packet,
wherein the processor is further configured to reapply the service chain encapsulation to the updated packet,
wherein the transmitter is further configured to forward the updated packet along the service chain path,
wherein the service chain encapsulation comprises information identifying the service chain path, and
wherein the service chain encapsulation further comprises information indicating an order of services for application to a flow traversing the service chain path.

\* \* \* \* \*

UNITED STATES PATENT AND TRADEMARK OFFICE
CERTIFICATE OF CORRECTION

PATENT NO. : 9,705,702 B2
APPLICATION NO. : 14/618888
DATED : July 11, 2017
INVENTOR(S) : Ian Foo et al.

It is certified that error appears in the above-identified patent and that said Letters Patent is hereby corrected as shown below:

On the Title Page

Page 2, Column 1, Line 20, Other Publications, should read:
IEEE Standard for Information Technology - Telecommunications and Information Exchange Between Systems - Local and Metropolitan Area Networks - Specific Requirements, Part 3: Carrier Sense Multiple Access with Collision Detection (CSMA/CD) Access Method and Physical Layer Specifications, Section Three," IEEE Computer Society, IEEE Std. 802.3™-2008, Dec. 26, 2008, 315 pages.

In the Claims

Column 11, Lines 40-43, Claim 5, should read:
5. The method of claim 1, wherein forwarding the updated packet along the service chain path comprises forwarding the updated packet to a second service chain node for application of a second service along the service chain path.

Column 12, Lines 8-31, Claim 10, should read:
10. An apparatus comprising:
    a receiver configured to receive an encapsulated service chain packet from a classifying node along a service chain path;
    a processor coupled to the receiver and configured to remove a service chain encapsulation containing the service chain path from the encapsulated service chain packet to generate a service chain packet without the service chain path; and
    a transmitter coupled to the processor and configured to transmit the service chain packet to a service device that is not aware of any part of the service chain path due to removal of the service chain encapsulation by the processor,
    wherein the receiver is further configured to receive the service chain packet back from the service device as an updated packet,
    wherein the processor is further configured to re-apply the service chain encapsulation to the updated packet, Signed and Sealed this
Sixteenth Day of October, 2018

Andrei Iancu
*Director of the United States Patent and Trademark Office*